(12) United States Patent
Ferrin et al.

(10) Patent No.: US 8,116,921 B2
(45) Date of Patent: Feb. 14, 2012

(54) FOLLOWER VEHICLE CONTROL SYSTEM AND METHOD FOR FORWARD AND REVERSE CONVOY MOVEMENT

(75) Inventors: Jeffrey L. Ferrin, Petersboro, UT (US); Brett Thayn, Petersboro, UT (US); Michael Hornberger, Petersboro, UT (US)

(73) Assignee: Autonomous Solutions, Inc., Petersboro, UT (US)

( * ) Notice: Subject to any disclaimer, the term of this patent is extended or adjusted under 35 U.S.C. 154(b) by 650 days.

(21) Appl. No.: 12/238,733

(22) Filed: Sep. 26, 2008

(65) Prior Publication Data

US 2010/0049374 A1 Feb. 25, 2010

Related U.S. Application Data

(60) Provisional application No. 61/189,527, filed on Aug. 20, 2008, provisional application No. 61/091,273, filed on Aug. 22, 2008.

(51) Int. Cl.
*G05D 1/00* (2006.01)

(52) U.S. Cl. ........... 701/1; 701/96; 701/217; 242/390.8; 242/412

(58) Field of Classification Search .................. None
See application file for complete search history.

(56) References Cited

U.S. PATENT DOCUMENTS

| | | | | |
|---|---|---|---|---|
| 5,572,449 | A * | 11/1996 | Tang et al. | 700/304 |
| 6,640,164 | B1 * | 10/2003 | Farwell et al. | 701/2 |
| 7,302,321 | B2 * | 11/2007 | Suzuki et al. | 701/23 |
| 2009/0012666 | A1 * | 1/2009 | Simpson et al. | 701/23 |

OTHER PUBLICATIONS

Dudek, G., et al., "Experiments in Sensing and Communication for Robot Convoy Navigation," IEEE, 1995, pp. 268-273.
Sorensen, David Kristin, et al., "On-Line Optical Flow Feedback for Mobile Robot Localization/Navigation," IEEE, 2003, pp. 1246-1251.
Wu, Jianping, et al., "Vehicle to Vehicle Communication Based Convoy Driving and Potential Applications of GPS," IEEE, Autonomous Decentralized System, IEEE, 2002, pp. 212-217.
Hedrick, J.K., et al., "Vehicle Modeling and Control for Automated Highway Systems," Tech. Rep., University of California, Berkley, 1993.
Tan, Han-Shue, et al., "Vehicle Lateral Warning, Guidance and Control Based on Magnetic Markers: PATH Report of AHSRA Smart Cruise 21 Proving Tests," Tech Rep., University of California, Berkley, 2001.
Cowan, Noah, et al., "Vision-based Follow-the-Leader," IEEE, 2003, pp. 1796-1801.

(Continued)

*Primary Examiner* — Michael J. Zanelli
(74) *Attorney, Agent, or Firm* — Fennemore Craig, P.C.

(57) ABSTRACT

A vehicle control system for causing a follower vehicle to follow a leader may have a tether system mounted to the follower vehicle. The tether system may include a tether having an end adapted to be attached to the leader, a length sensor, and an angle sensor. A path tracking system operatively associated with the tether system determines a path traveled by the leader. A path control system operatively associated with the path tracking system and the follower vehicle causes the follower vehicle to follow the path traveled by the leader. A spacing control system operatively associated with the path tracking system and the follower vehicle causes the follower vehicle to maintain a predetermined spacing between the follower vehicle and the leader.

13 Claims, 13 Drawing Sheets

OTHER PUBLICATIONS

Belkhouche, Feihi, et al., "Modeling and Controlling a Robotic Convoy Using Guidance Laws Strategies," IEEE Transactions on Systems, Man and Cybernetics, vol. 35, 2005, pp. 813-825.

Debenest, Paulo, et al., "Proposal for Automation of Humanitarian Demining with Buggy Robots," IEEE, 2003, pp. 329-334.

Fukushima, Edwardo, F., et al., "A New Flexible Component for Field Robotic System," IEEE Proceedings, 2003, pp. 2583-2588.

Hedrick, J.K., et al., "Control Issues in Automated Highway Systems," IEEE, 1994, pp. 21-32.

Mariottini, Gian Luca, et al., "Vision-based Localization of Leader-Follower Formations," IEEE, 2005, pp. 635-640.

Doh, Nakju, et al., "Accurate Relative Localization Using Odometry," IEEE Proceedings, 2003, pp. 1606-1612.

Borenstein, J., et al., "Gyrodometry: A New Method for Combining Data from Gyros and Odometry in Mobile Robots," IEEE, 1996, pp. 423-428.

Coulter, R. Craig, "Implementation of the Pure Pursuit Path Tracking Algorithm," Tech. Rep., Carnegie Mellon University, 1992, 11 pages.

\* cited by examiner

FOLLOWER VEHICLE CONTROL SYSTEM AND METHOD FOR FORWARD AND REVERSE CONVOY MOVEMENT

REFERENCE TO CO-PENDING PROVISIONAL APPLICATIONS

Applicants hereby claim the benefit of earlier filed co-pending provisional applications, Application No. 61/189,527, filed on Aug. 20, 2008, and Application No. 61/091,273, filed Aug. 22, 2008, both of which are specifically incorporated herein by reference for all that they disclose.

TECHNICAL FIELD

This invention relates to vehicle control systems in general and more specifically to control systems for vehicle convoys.

BACKGROUND

A convoy can be used to transport large quantities of items to a certain destination in order to reduce the amount of time and number of return trips required, provide support for vehicles in order to attain safe travel, and can also be used to reduce traffic congestion on roadways. A robotic convoy can be used to further the efficiency of convoy missions in many different areas.

The robotic convoy concept can be used with many different types of robotic vehicles. In its simplest form, the robotic convoy includes a leader vehicle and a follower vehicle. The leader and follower vehicles can be in two-way communication throughout a mission. It is then possible for the follower vehicle to receive information from the leader vehicle in order to aid the follower vehicle in following the path of the leader vehicle.

In the past, different methods for following the leader vehicle have been developed. One such method uses the global positioning system (GPS) to provide position information for the various vehicles. Unfortunately, however, GPS receives require a direct view or "line-of-sight" access to at least three, and typically more, GPS satellites. This direct view or line-of-sight limitation typically prevents GPS systems from being used around large buildings (e.g., in urban areas), in tunnels, or underground. Furthermore, the position update frequency of most GPS systems is not rapid enough to allow for fast traveling where the convoy vehicles are close and rapid response times are required.

Another type of convoy system uses magnetic markers wherein permanent, discrete magnetic markers line the path to be driven. This system has limited utility in that it can only be used where magnet markers are present. Camera-based robotic convoy systems have also been developed in which the follower vehicle uses one or more cameras to track the leader vehicle. However, the data received from the camera is too large and cumbersome for use at high speeds. Another drawback is that the leader vehicle must always be in the line of sight of the camera.

SUMMARY OF THE INVENTION

One embodiment of a vehicle control system for causing a follower vehicle to follow a leader may comprise a tether system mounted to the follower vehicle, the tether system including a tether having an end adapted to be attached to the leader, a length sensor operatively associated with the tether, and an angle sensor operatively associated with the tether. A path tracking system operatively associated with the tether system determines a path traveled by the leader. A path control system operatively associated with the path tracking system and the follower vehicle causes the follower vehicle to follow the path traveled by the leader. A spacing control system operatively associated with the path tracking system and the follower vehicle causes the follower vehicle to maintain a predetermined spacing between the follower vehicle and the leader.

Another embodiment of a vehicle control system for causing a follower vehicle to follow a leader may comprise a tether mounted to the follower vehicle, the tether having an end adapted to be attached to the leader. Length sensing means operatively associated with the tether senses a length of the tether extending between the follower vehicle and the leader. Angle sensing means operatively associated with the tether senses an angle between the tether and the follower vehicle. A path tracking system operatively associated with the length sensing means and the angle sensing means determines a path traveled by the leader. A path control system operatively associated with the path tracking system and the follower vehicle causes the follower vehicle to follow the path traveled by the leader. A spacing control system operatively associated with the path tracking system and the follower vehicle causes the follower vehicle to maintain a predetermined spacing between the follower vehicle and the leader.

Also disclosed is a method for causing a follower vehicle to follow a leader that comprises: Connecting the follower vehicle and the leader with a tether; measuring a length of the tether connecting the follower vehicle and leader; measuring an angle between the tether and the follower vehicle; determining a position of the leader based on the measured length and the measured angle; determining a path traveled by the leader based on a plurality of determined leader positions; steering the follower vehicle so that the follower vehicle substantially follows the path traveled by the leader; and controlling a velocity of the follower vehicle so that the follower vehicle maintains a predetermined distance from the leader.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
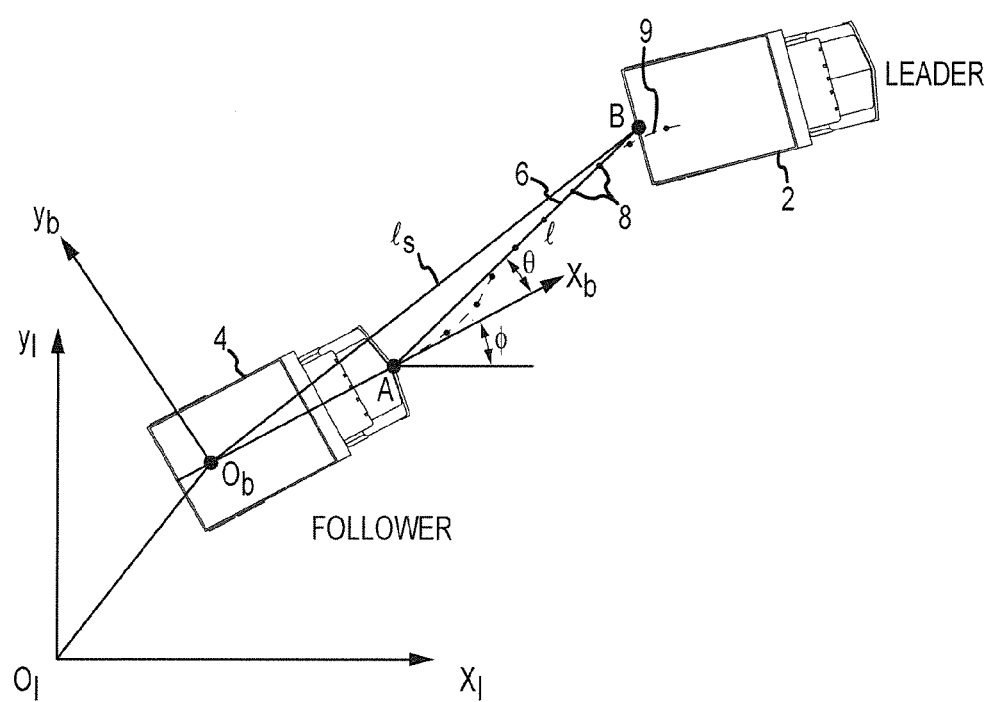
FIG. 1 is a pictorial representation of a leader/follower system according to one embodiment of the present invention showing an inertial coordinate system and a follower vehicle coordinate system.

One embodiment of a vehicle control system 1 for causing a follower vehicle 4 to follow a leader 2 is best seen in FIGS. 1-5 and may comprise a tether system 30 that is mounted to the follower vehicle 4. Tether system 30 includes a tether 6 having an end that is adapted to be attached to the leader 2, e.g., at point "B" of leader 2. A length sensor 36 (FIG. 5) operatively associated with tether system 30 senses a length l of tether 6 that extends between leader 2 and follower vehicle 4 (e.g., between points "A" and "B"), as best seen in FIG. 1. Tether system 30 also includes an angle sensor 40 (FIG. 5) that senses an angle θ between tether 6 and the follower vehicle 4, as also best seen in FIG. 1.

A path tracking system 10 (FIGS. 2 and 3) operatively associated with the tether system 30 receives from the tether system 30 information about the length l of tether 6 and the angle θ that tether 6 makes with respect to follower vehicle 4. Path tracking system 10 uses the tether length l and angle θ to determine a path 9 traveled by leader 4. A path control system 12 operatively associated with the path tracking system 10 and the follower vehicle 4 causes the follower vehicle 4 to follow the path 9 traveled by leader 2. A spacing control system 14 operatively associated with the path tracking system 10 and the follower vehicle 4 maintains a predetermined spacing or distance between the leader 2 and follower vehicle 4.

Vehicle control system 1 may be operated to cause the follower vehicle 4 to follow the path 9 traveled by leader 2. Consider, for example, a situation wherein the follower vehicle 4 has been connected to the leader 2 by the tether 6. As the leader 2 begins to move, it begins defining a path 9 that is to be followed by follower vehicle 4. The path 9 is determined by measuring both the length l of tether 6 extending between the leader 2 and follower vehicle 4 as well as by the angle θ that tether 6 makes with the follower vehicle 4. More specifically, each measured length l and corresponding angle θ of tether 6 is used to define a leader position or "traveled point" 8 in an inertial reference frame $X_I, Y_I, Z_I$, as illustrated in FIG. 1. A plurality of leader positions or traveled points 8 thus define the path 9 traveled by leader 2. Consequently, as the leader 2 continues to move, defining path 9 as it does so, the system 1 determines the path 9 traveled by the leader by measuring over time both the length l of tether 6 as well as the angle θ that tether 6 makes with the follower vehicle 4.

In the embodiment shown and described herein, the path tracking system receives the length l and angle θ measurements from the tether system 30 and produces or maps the path 9 traveled by the leader 2 in the inertial coordinate system $X_I, Y_I, Z_I$ illustrated in FIG. 1. The path control system 12 and spacing control system 14 receive from the path tracking system 10 information (e.g., x,y coordinates in the inertial reference frame) relating to the path 9 traveled by follower vehicle 4. See FIG. 2. The path control system 12 steers the follower vehicle 4 so that the follower vehicle 4 substantially follows the path 9 traveled by the leader 2. Similarly, spacing control system 14 controls the speed or velocity of the follower vehicle 4 so that the follower vehicle maintains a predetermined distance from the leader 2.

A significant advantage of the present invention is that it provides a control system for a follower vehicle that does not require any input or communication from the leader 2. Follower vehicle 4 will simply begin following leader 2 as soon as leader 2 begins to move. Consequently, the present invention is free of the problems and limitations associated with systems that require communication between the leader 2 and follower vehicle 4.

Another advantage of the present invention is that it may be operated in either the forward direction or the reverse direction. That is, in addition to "leading" the follower vehicle 4, the leader 2 may be used to back the follower vehicle 4 in the reverse direction. As will be described in greater detail herein, operation of the system in the reverse direction may be accomplished in accordance with a variety of modes. For example, in one reverse operation mode, the leader 2 may back the follower vehicle 4 in a manner akin to backing a trailer. In another mode, the follower vehicle 4 may be backed along the same path 9 originally defined by leader 2.

Figure 3:
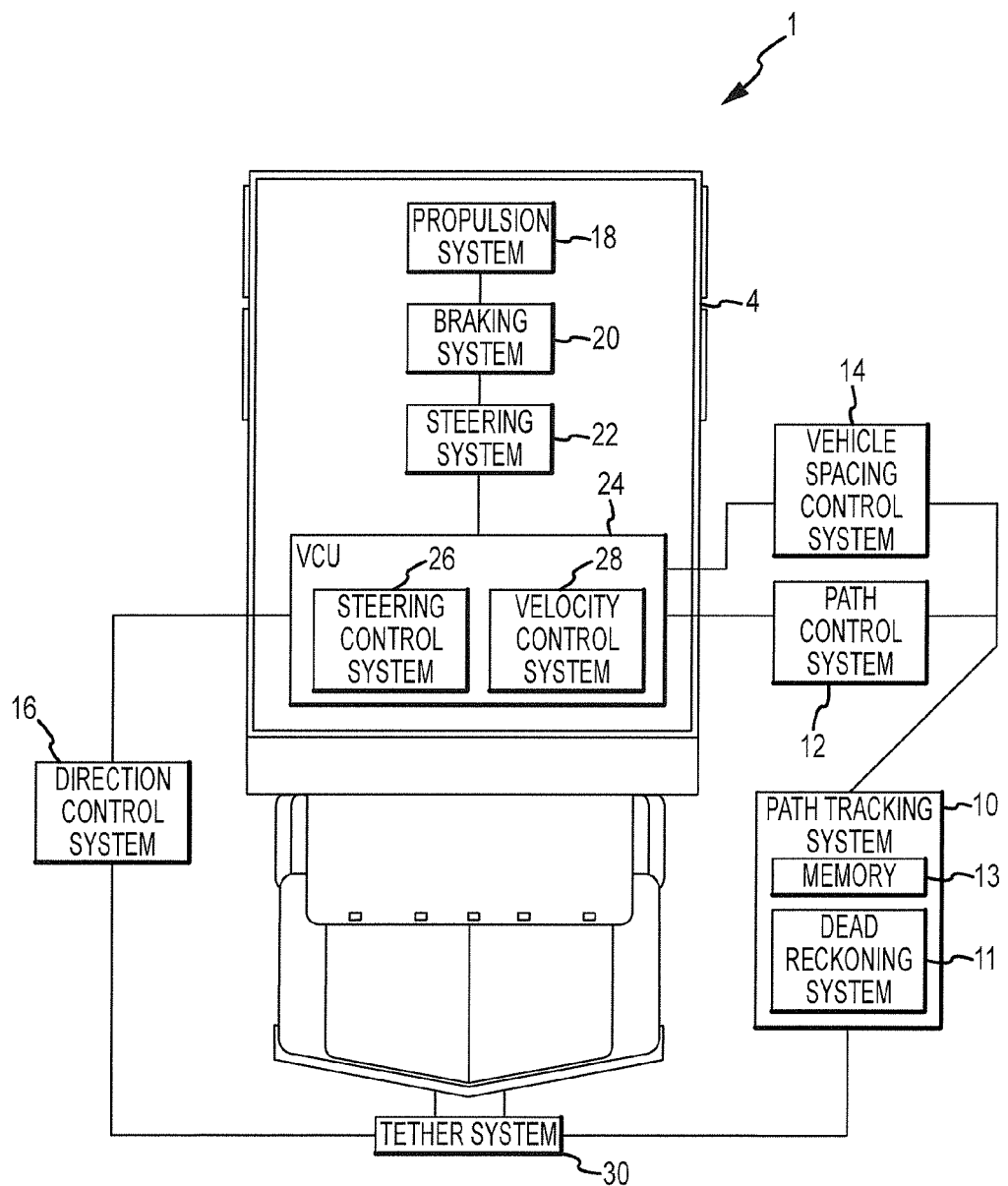
FIG. 3 is a pictorial representation of the follower vehicle control system showing its relationship with various components of the follower vehicle.

Still another advantage of the present invention is that it does not require the follower vehicle to have a driver or operator. Indeed, in the embodiments shown and described herein, the follower vehicle 4 may be completely autonomous. In one autonomous embodiment, the control system 1 is provided with a direction control system 16 (FIG. 3). The direction control system 16 may be used to automatically select a travel direction for the follower vehicle 4 (e.g., by operating the transmission of the follower vehicle 4 in either the forward (i.e., "Drive") or reverse modes) by sensing (e.g., via tether 6) whether the leader is beginning to move in the forward direction or the reverse direction. Alternatively, such autonomous operation is not required, and follower vehicle 4 may require the presence of an operator to perform at least some operations (e.g., starting the engine of the vehicle, selecting the appropriate transmission gear, etc.).

Still yet other advantages are associated with the vehicle control system of the present invention. For example, because the present invention does not require the leader 2 to provide any propulsive or towing force to the follower vehicle 4, any of a wide range of leaders 2 and follower vehicles 4 may be used without regard to type or size differential between leader 2 and follower vehicle 4. For example, in one embodiment, the leader 2 may comprise a small automobile or pick-up truck, whereas the follower vehicle 4 may comprise a heavy truck having the capacity to haul a large payload. In another embodiment, the leader 2 may comprise a much smaller vehicle, such as a motorcycle, or even a bicycle. Indeed, leader 2 need not even comprise a vehicle at all, and could in another embodiment, comprise a person walking on foot.

Still yet another advantage of the control system 1 of the present invention is that it is not limited to use with convoys comprising only one leader 2 and one follower vehicle 4. For example, in another embodiment additional follower vehicles (with corresponding control systems 1) could be attached to follower vehicle 4 in a sequential manner. In such a configuration, each additional follower vehicle would become the leader for the vehicle immediately behind.

Having briefly described the vehicle control system 1 according to one embodiment of the present invention, as well as some of its more significant features and advantages, various embodiments and alternative configurations of the vehicle control system 1 and methods for causing a follower vehicle to follow a leader will now be described in detail.

Referring back now to FIGS. 1-4, one embodiment of a vehicle control system 1 is shown and described herein as it could be utilized on a single follower vehicle 4 to follow a single leader 2, although other convoy configurations are possible. In the embodiment shown and described herein, both the leader 2 and the follower vehicle 4 comprise trucks. However, other types of vehicles could be used. For example, and as mentioned above, the leader 2 need not even comprise a vehicle, but could instead comprise any of a wide variety of "moving systems," such as bicycles, motorcycles, or even pedestrians. Similarly, follower vehicle 4 may comprise any of a wide range of vehicles. However, it is generally desired, but not required, that follower vehicle comprise a vehicle that could be provided with systems to allow it to be autonomously operated (i.e., without driver input or supervision). Alternatively, however, the follower vehicle 4 need not be fully autonomous and may require some degree of driver input. Still other variations are possible, as would become apparent to persons having ordinary skill in the art after having become familiar with the teachings provided herein. Consequently, the present invention should not be regarded as limited to any particular type of leader 2 or follower vehicle 4.

Figure 4:
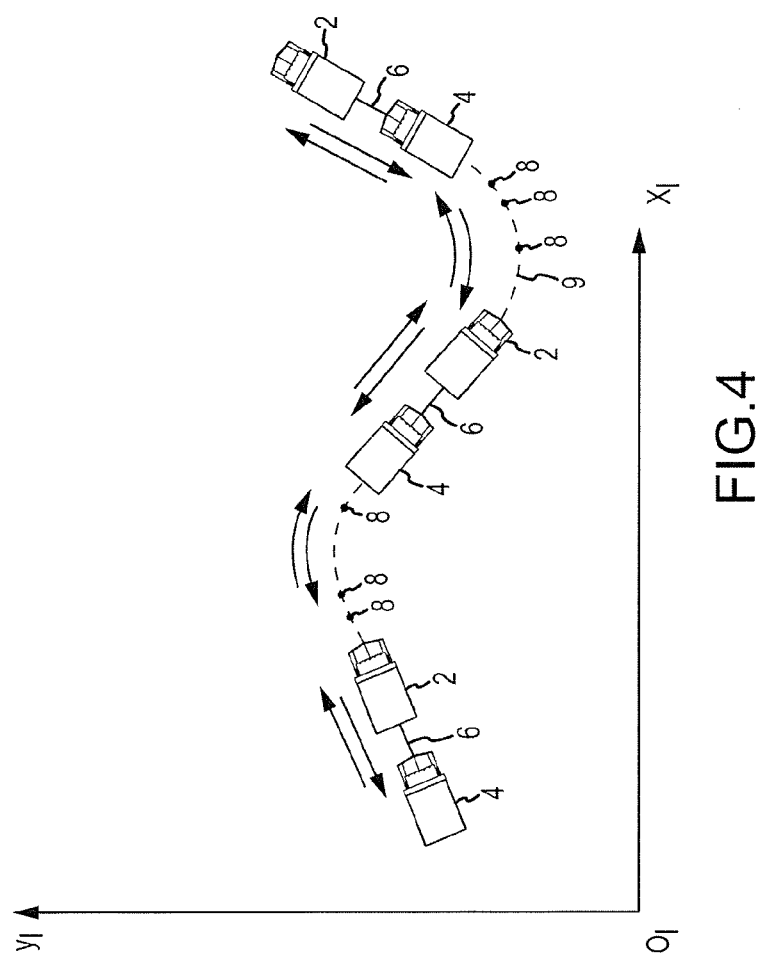
FIG. 4 is a pictorial representation, within the inertial coordinate system, of the leader and follower moving in a forward direction and in a reverse direction.

The follower vehicle 4 is provided with a tether 6, one end of which is configured to be attached to the leader 2. Accordingly, tether 6 will extend between point "A" on follower vehicle 4 and point "B" on leader 2, as best seen in FIG. 1. In the embodiment shown and described herein, tether 6 may comprise a portion of a tether system 30 (FIGS. 2 and 3) having a length sensor 36 and an angle sensor 40 (both of which are illustrated in FIG. 4). Length sensor 36 allows tether system 30 to measure the length l of tether 6 between point "A" on follower vehicle 4 and point "B" on leader 2. Angle sensor 40 measures the angle $\theta$ that tether 6 makes with the follower vehicle 4 (e.g., the $X_b$ axis of follower vehicle 4). As will be described in much greater detail herein, the control system 1 utilizes the length l and angle $\theta$ of tether 6 to determine the path 9 traveled by leader 2 in inertial coordinate system or frame, $X_I, Y_I, Z_I$, depicted in FIG. 1. The system also utilizes a body coordinate system or frame, $X_b, Y_b$, that is fixed with respect to the follower vehicle 4, as also depicted in FIG. 1.

Figure 2:
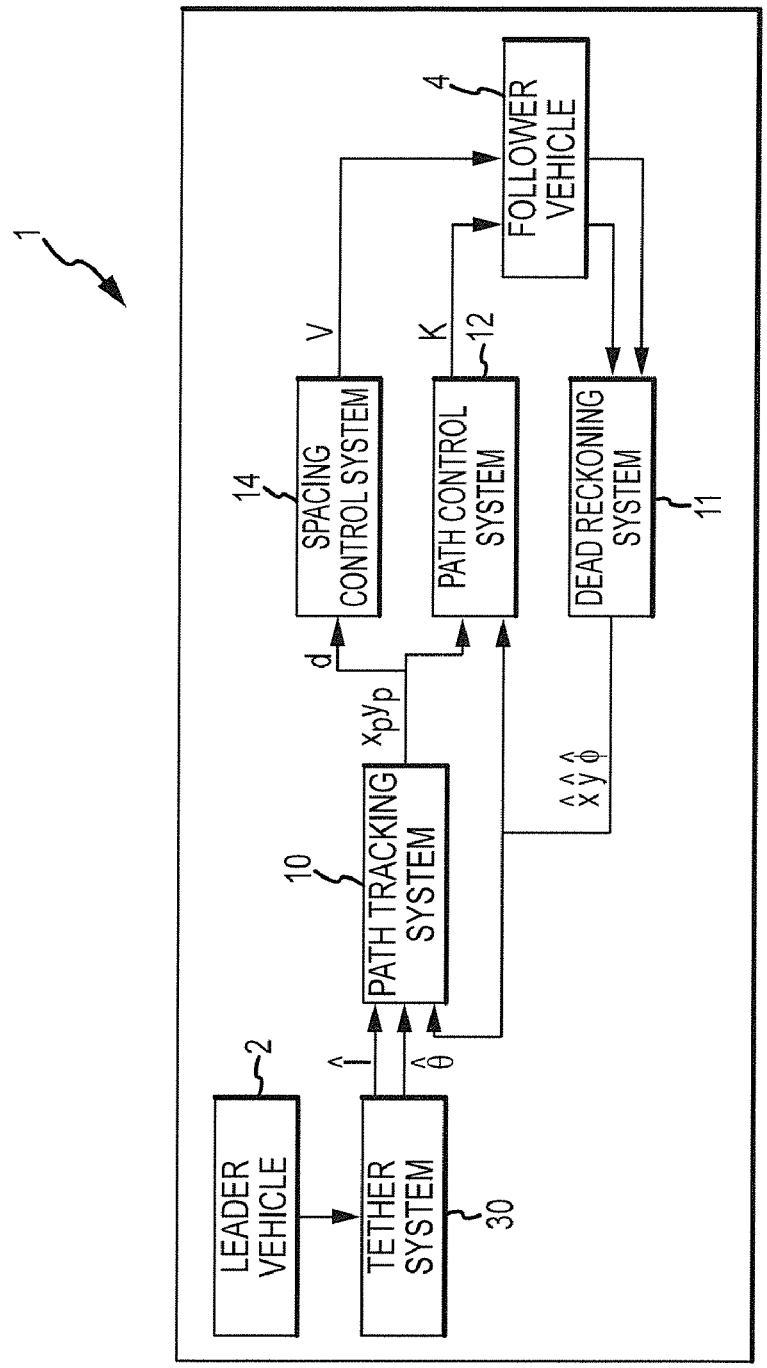
FIG. 2 is a system block diagram of a leader/follower convoy system illustrated in FIG. 1.

Referring primarily now to FIGS. 2 and 3, the control system 1 may also comprise a path tracking system 10. Path tracking system 10 receives data from the tether system 30 (e.g., the measured values of the length l and angle $\theta$ of tether 6) and uses that information to determine for leader 2 a "leader position" or "traveled" point 8 (FIGS. 1 and 4). The leader position or traveled point 8 may be represented as x,y coordinates in the inertial coordinate system or frame $X_I, Y_I, Z_I$, depicted in FIG. 1. Path tracking system 10 utilizes a plurality of tether measurements (e.g., length l and angle $\theta$) taken over time to identify a plurality of traveled points 8 which, taken together, define path 9 traveled by leader 2.

System 1 may also be provided with a path control system 12 that is operatively associated with the path tracking system 10. Path control system 12 receives the position data from the path tracking system 10 and uses that data to produce a desired curvature "k" to be followed by the follower vehicle 4 in the manner that will be described in greater detail below. A spacing control system 14 receives length or spacing data and uses that data to produce a desired velocity "V" for the follower vehicle 4. As will also be described in much greater detail below, the desired velocity "V" is used to maintain a predetermined spacing between the follower vehicle 4 and leader 2.

System 1 may also comprise a dead reckoning system 11 that is operatively associated with the vehicle 4. As its name implies, dead reckoning system 11 provides estimates of the position (e.g., x,y) of the follower vehicle 4 as well as its heading "$\phi$". The estimates of the position and heading of follower vehicle 4 are used in the manner described below. Dead reckoning system 11 may comprise any of a wide range of systems and devices suitable for providing estimates of the position and heading of follower vehicle 4. By way of example, in one embodiment, dead reckoning system 11 may comprise an odometer and steering angle sensor (not shown). Alternatively, an odometer and a heading gyroscope could also be used. Still other variations are possible. For example, in yet another embodiment, the dead reckoning system 11 could comprise an inertial platform (e.g., comprising either mechanical gyros or laser gyros). In still yet another embodiment, position information could be provided by a global positioning system (GPS) receiver.

However, because dead reckoning systems of the type that could be utilized herein are well known in the art and could be readily provided by persons having ordinary skill in the art after having become familiar with the teachings provided herein, and because the details of the dead reckoning system are not required to understand the present invention, the particular dead reckoning system 11 that may be utilized in various embodiments will not be described in further detail herein.

As mentioned above, it is generally preferred, but not required, that the follower vehicle 4 be fully autonomous, i.e., so that it can operate and follow the leader 2 without requiring driver input. In such an embodiment, follower vehicle 4 may need to be provided with additional systems and devices to allow the follower vehicle 4 to respond to the vehicle control system 1 in a way that will allow the follower vehicle 4 to operate fully autonomously. For example, and with reference now primarily to FIG. 3, follower vehicle 4 may be provided with a propulsion system 18, a braking system 20, and a steering system 22, each of which is operatively connected to a vehicle control unit (VCU) 24. Vehicle control unit 24 may be provided with a steering control system 26 and a velocity control system 28 to allow the vehicle control unit 24 to operate the propulsion system 18, braking system 20, and steering system 22 of follower vehicle 4. The vehicle control unit 24 is also operatively associated with the vehicle control system 1 and is responsive to control signals produced thereby. Stated simply, then, in the embodiment illustrated in FIG. 3, the vehicle control unit 24 acts as the interface between the various mechanical systems of follower vehicle 4 (e.g., the propulsion system 18, braking system 20, and steering system 22) and the vehicle control system 1.

Alternatively, other vehicle control configurations are possible, as would become apparent to persons having ordinary skill in the art after having become familiar with the teachings provided herein. Consequently, the present invention should not be regarded as limited to any particular configuration for interfacing with the various mechanical systems of follower vehicle 4.

Referring now to FIGS. 5, 6, 7A, and 7B, the tether system 30 of one embodiment may comprise a spool 34 sized to receive a length of tether 6. Tether 6 may comprise any of a wide range of generally lightweight, cord-like materials, preferably having high tensile strengths. By way of example, in one embodiment, tether 6 comprises an aeromatic copolyamid material available from Teijin Limited, of Tokyo Japan under the trademark "Technora". Alternatively other materials may also be used.

Spool 34 is mounted for rotation within tether system 30, e.g., via spool shaft 34a, and is driven by a motor 32 via drive belt 33 and sprocket or sheave 34b. A length sensor 36 operatively associated with the spool 34 may be used to measure the amount or length of tether 6 that is unwound from spool 34. By way of example, in one embodiment, length sensor 36 comprises a multiple turn absolute encoder, although other sensors could be used as well.

In operation, motor 32 pays out or reels in the tether 6 as necessary, depending on the positions and velocities of leader 2 and follower 4, as will be described in greater detail below. In addition, motor 32 is used to keep tether 6 under a predetermined tension, e.g., by applying a constant torque to spool 34. For example, if the tension in tether 6 exceeds the desired amount (e.g., as a result of the leader 2 accelerating), motor 32 may be controlled or operated to pay out the tether 6 until the desired torque is re-attained and the predetermined tension is once again present in tether 6. The predetermined tension in tether 6 is such that there is a certain amount of sag allowed in the length of tether 6 extending between the follower vehicle 4 and leader 2. The tension may be varied depending on the distance between the leader 2 and follower vehicle 4 to ensure that tether 6 does not drag on the ground. The tension in tether 6 is also important in obtaining accurate measurements of the angle θ.

Tether system 30 may also be provided with a tether guide 38 to evenly distribute the tether 6 onto spool 34 as spool 34 reels in tether 6. As spool 34 rotates, the tether guide 38 slides axially along a rotating shaft 38a which is rotated via sprocket or sheave 38b and fixed guide shaft 38c. The rotating shaft 38a and guide shaft 38c run parallel to each other and to the spool shaft 34a. The tether guide 38 further includes a transmission 38d that translates the rotation of the rotating shaft 38a into axial movement along the rotating shaft 38a and guide shaft 38c. Thus, the rotational direction of the rotating shaft 38a dictates the axial direction of the tether guide 38. As the spool 34 rotates, the tether 6 slides past the guide roller 38e of the tether guide 38 while the tether guide 38 moves axially to evenly distribute the tether 6.

Figure 5:
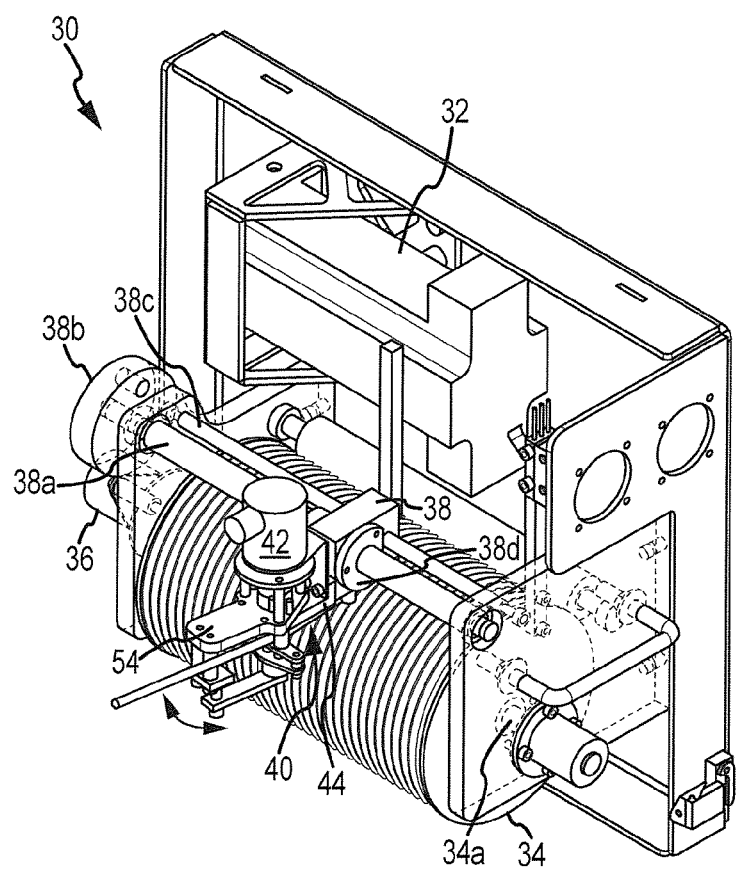
FIG. 5 is a perspective view of a tether system in accordance with an embodiment of the present invention.
Figure 6:
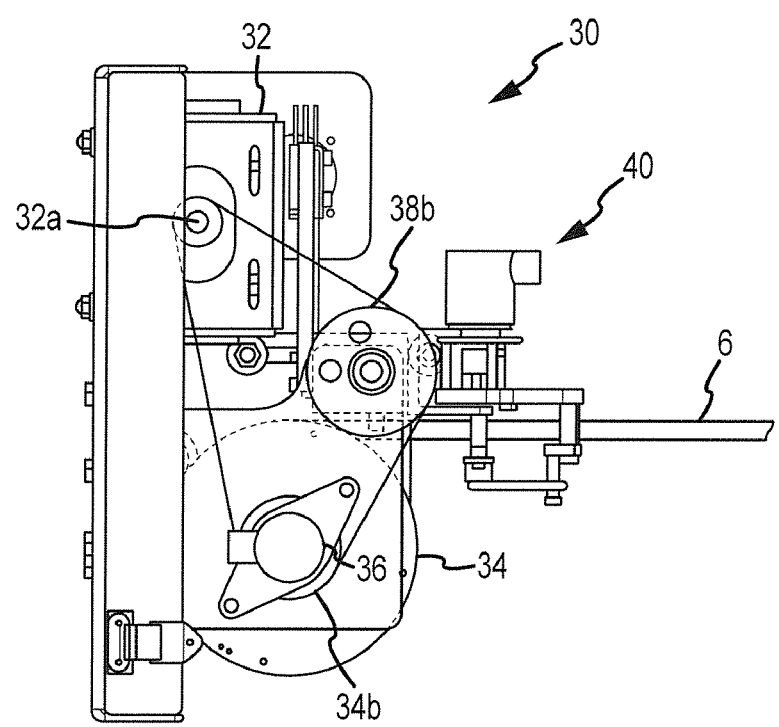
FIG. 6 is a left side view in elevation of the tether system illustrated in FIG. 5.
Figure 7:
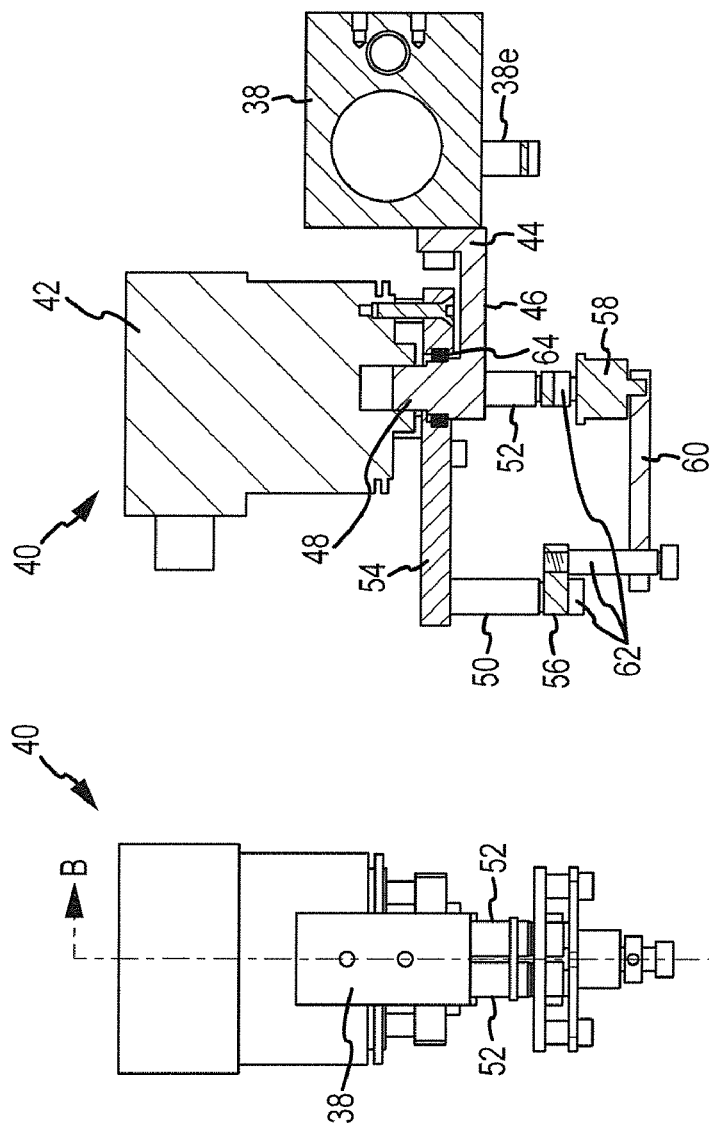
FIG. 7A is a rear side view in elevation of an angle sensor of the tether system illustrated in FIGS. 5 and 6.
FIG. 7B is a cross-sectional view in elevation of the angle sensor taken along the line B-B of FIG. 7A.

Referring to FIGS. 5 and 6, a belt 33 links the motor 32, spool 34 and tether guide 38. The belt 33 wraps around a shaft 32a of the motor 32 and passes over the sprockets or sheaves 34b and 38b. Thus, the belt 33 engages the shaft 32a, and pulleys 34b, 38b to deliver the output of the motor 32 to the spool 34 and tether guide 38. That is, the rotation of the shaft 32a rotates the spool shaft 34a (via pulley 34b) and the rotating shaft 38a (via pulley 38b). Accordingly, the rotational direction of the shaft 32a dictates the rotational direction of the spool 34 and the axial direction of the tether guide 34.

The angle sensor 40 measures the angle θ between the tether 6 and the direction of travel ($X_b$-axis) of the follower 4, as illustrated in FIG. 1. Referring now primarily to FIGS. 5-7B, the angle sensor 40 is mounted to and extends outwardly from the tether guide 38. The tether 6 slides through the angle sensor 40 as the spool 34 rotates. The angle sensor 40 includes a sensor 42, a mounting bracket 44, a base 46, a base shaft 48, first and second pairs of rollers 50, 52, and an arm 54. Sensor 42 senses or measures the rotation of arm 54 and, in one embodiment, may comprise a single-turn, absolute, 13-bit optical encoder. Alternatively, other types of sensors could be used as well.

Referring to FIGS. 7A and 7B, the angle sensor 40 is mounted to the tether guide 38 by the mounting bracket 44. The base 46 extends outwardly from the mounting bracket 44 and ends with a vertical base shaft 48. The sensor 42 is connected to the base shaft 48 and the arm 54 is rotatably mounted to the base shaft 48 with a bearing 64 disposed therebetween. The arm 54 rotates about the base shaft 48 as the angle θ changes. That is, as the leader 2 causes the tether 6 to move, the arm 54 also moves. This movement of the arm 54 is sensed by sensor 42 and translated to provide a measurement of the angle θ. Bolts 62 attach a pair of first rollers 50 to an under side of an outward end of the arm 54. Bolts 62 also attach a pair of second rollers 52 to an under side of the base 46. The first and second rollers 50, 52 are disposed on the angle sensor 40 to allow the tether 6 to slide through the angle sensor 40 yet cause appropriate movement of the arm 54 to convey the angle θ of the tether 6.

Angle sensor 40 may also be provided with a damper 58 that is coupled to the second rollers 52 and an end of a swing arm 60. The other end of the swing arm 60 is attached to a bolt 62 secured to the under side of a lower platform 56. The lower platform 56 is coupled to the first rollers 50. The damper 58 is preferably a rotary damper and damps out the oscillations in the tether 6 as both the leader 2 and follower 4 are moving.

The present invention advantageously provides a follower vehicle control system 1 and method 100 that causes the follower 4 to follow the general path of the leader 2 while maintaining a predetermined spacing between the leader 2 and the follower 4. In order to follow the general path of the leader 2, the path tracking system 10 uses the tether measurements (angle θ and length l) obtained from the tether unit 30. The path tracking system 10 uses the angle θ and the length l to calculate the position of the leader 2 with respect to the follower 4. Once the path tracking system 10 determines the path that the leader 2 has traveled, the path control system 12 and the vehicle spacing control system 14 control the follower 4 via the VCU 24 (FIG. 3) to generally follow the same path while maintaining the correct spacing between the follower 4 and the leader 2.

Referring to FIGS. 1 and 3, the path tracking system 10 is configured to determine a plurality of traveled points 8 in a path traveled by the leader 2 based on data from the tether unit 30. The path tracking system 10 uses two different coordinate frames in conjunction to track the leader 2, as shown in FIG. 1. The first is the inertial coordinate system or frame ($O_I X_I Y_I$) and the second is the follower body coordinate system or frame ($O_b X_b Y_b$). The follower body frame ($O_b X_b Y_b$) is fixed on the follower 4 such that the origin $O_b$ is located at the control point of the follower 4 (e.g. midpoint of the rear axle) and the $X_b$-axis is in the direction of travel of the follower 4. The angle θ is measured from the $X_b$-axis of the follower body frame ($O_b X_b Y_b$) to the tether 6. The heading of the follower 4 is the angle θ and is measured from the inertial coordinate frame $X_I$-axis to the follower body frame $X_b$-axis.

The inertial coordinate frame ($O_I X_I Y_I$) is fixed in space and may be the same as the follower body frame ($O_b X_b Y_b$) at initialization (e.g. at power-on). Still referring to FIG. 1, at an initial stage when the leader 2 begins movement, traveled points 8 have yet to be acquired. During this brief initial stage, the path tracking system 10 determines a straight line $l_s$ drawn from the control point $O_b$ to the point where the tether 6 attaches to the leader 2 (point B) using the distance between the control point $O_b$, the angle θ and the length l of the tether 6. The path tracking system 10 then selects points along the line $l_s$ and stores them as an inertial coordinate ($x_I$, $y_I$) in memory 13 until traveled points 8 begin to be obtained and stored in memory 13. Thus, the path control system 12 controls the follower 4 to the selected points along the line $l_s$ stored in memory 13 and then transitions to controlling the follower 4 to traveled points 8 stored in memory 13.

From the measured angle θ and length l of the tether 6, the x and y coordinate position of the point where the tether 6 attaches to the leader 2 (i.e., point "B") may be determined in the follower body frame ($O_b$ $X_b$ $Y_b$). However, in order for the point "B" to be stored as a traveled point 8 traveled by the leader 2, the path tracking system 10 transforms the point B into the inertial coordinate frame ($O_I$ $X_I$ $Y_I$). After each point "B" that is sampled is transformed into the inertial coordinate frame ($O_I$ $X_I$ $Y_I$), the path tracking system 10 stores the transformed point "B" in memory 13 as traveled point 8. An array or plurality of traveled points 8 defines the path 9 taken by the leader 2 (a measured path). In one embodiment, once a traveled point 8 is reached by the follower 4 it is erased from storage. Alternatively, a set number of traveled points 8 are stored (e.g. a sufficient number of traveled points 8 to travel 100 meters) regardless of whether the follower 4 has already reached the traveled point 8. Updated traveled points 8 replace the least recently traveled points 8 in storage, i.e. first in first out. The storage of a set number of traveled points 8 is most advantageous when the leader 2 reverses movement to reverse the convoy, as discussed below.

From the measurements of angle $\theta$ and length l, the x and y coordinate position of the leader in the body frame ($O_b$ $X_b$ $Y_b$) is $$B^b = \begin{bmatrix} d_t + \ell \cos\phi \\ \ell \sin\phi \end{bmatrix}$$

where the superscript b denotes that the point "B" is with respect to the body frame and $d_t$ is the distance from the point $O_b$ to the tether mounting location which lies directly on the x-axis of the follower body frame ($O_b$ $X_b$ $Y_b$).

The position $B^I$ of the leader 2 in the inertial coordinate frame ($O_I$ $X_I$ $Y_I$) is calculated using a homogeneous transformation $$B^I = H_b^I \begin{bmatrix} B^b_{2 \times 1} \\ 1_{1 \times 1} \end{bmatrix}$$

where $H^I_b$ is the homogeneous transformation matrix and where the superscript I is the reference frame to which the point will be translated and the subscript b is the current reference frame of the point that is being transformed. The homogeneous transformation matrix is $$H_b^I = \begin{bmatrix} R^I_{b(2 \times 2)} & O^I_{b(2 \times 1)} \\ O_{(1 \times 2)} & 1_{(1 \times 1)} \end{bmatrix}$$

where $R^I_b$ is the rotation matrix from the follower body frame to the inertial frame and the point $O^I_b$ is the location of the follower 4 in the inertial frame. The rotation matrix used in Equation 2.3 is $$R_b^I = \begin{bmatrix} \cos\phi & -\sin\phi \\ \sin\phi & \cos\phi \end{bmatrix}$$

The position of the follower ($O_b$ in FIG. 1) is critical to the performance of the entire system. The ability of the follower vehicle control system 1 and method 100 of the present invention to control the follower 4 to drive the path of the leader 2 depends on the determined location $O_b$ of the follower 4 itself.

The position of the follower 4 (control point $O_b$) is calculated using dead-reckoning (e.g., by dead reckoning system 11) by the path tracking system 10. The dead-reckoning system 11 calculates the current position of the follower 4 by calculating a $\Delta x$ and a $\Delta y$ that the follower 4 has traveled in one sample time and adding that to the last calculated position. The equations are $$\Delta x = \frac{\Delta \beta R}{\lambda} \cos(\phi)$$

$$\Delta y = \frac{\Delta \beta R}{\lambda} \sin(\phi)$$

where $\phi$ is the heading of the follower 4, $\Delta \beta$ is the change in angle of an output shaft (not shown) that comes off the front wheel differential of the follower 4, $\lambda$ is the gear ratio from the output shaft to the ring gear (not shown) in the differential and R is the radius of the follower's 4 front wheels. The value $$\frac{\Delta \beta}{\lambda}$$

gives an average rotation angle of the two front wheels. The heading $\phi$ may be measured using a fiber-optic gyro and the change in wheel rotation angle may be measured using an incremental optical encoder. Preferably, the dead-reckoning system 11 calculates the position $O_b$ within ±0.8 m after 50 m of driving, where 50 m is the maximum length of the tether 6, which is the maximum distance that a known point can be from the current position of the follower 4.

Because the path tracking system 10 measures the position of the leader 2 with respect to the follower 4 and then stores the point with reference to the inertial coordinate frame ($O_I$ $X_I$ $Y_I$), the maximum amount of dead-reckoning with respect to a sampled point should be 50 m.

The actual position of the leader 2 in the inertial coordinate frame ($O_I$ $X_I$ $Y_I$) is offset by the same amount of error in the estimate of the true position of the follower 4 in the inertial coordinate frame ($O_I$ $X_I$ $Y_I$) at the time when the measurement from the tether 6 is taken. That is, when a measurement is taken, there is no relative error from dead-reckoning between the leader 2 and the follower 4 in the inertial coordinate frame ($O_I$ $X_I$ $Y_I$) which means that dead-reckoning is needed only as far as required to make it to the traveled point 8.

Path Control System

Once the path tracking system 10 determines the path that the leader 2 has traveled, the path control system 12 and the vehicle spacing control system 14 control the follower 4 via the VCU 24 to generally follow the same path as the leader 2 while maintaining the correct spacing between the follower 4 and the leader 2.

Figure 8:
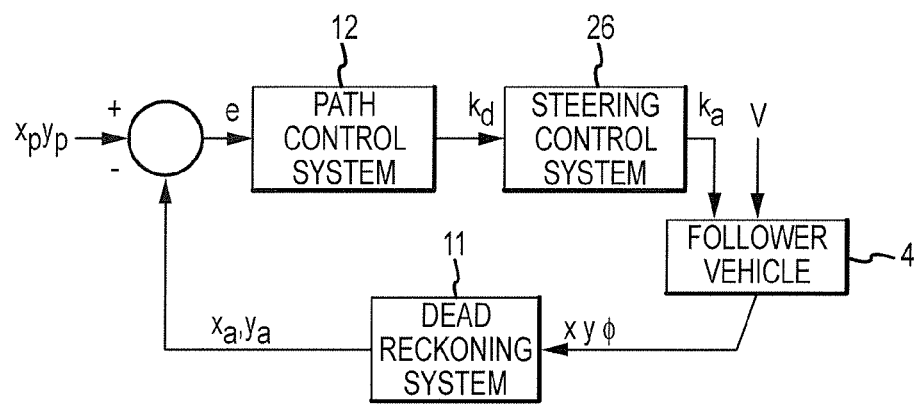
FIG. 8 is a schematic representation of a control loop involving the path control system.

FIG. 8 shows the interaction of the path control system 12 with the steering control system 26, dead reckoning system 11 and the follower vehicle 4. The velocity V shown as an input to the follower vehicle 4 in FIG. 8 is commanded by the vehicle spacing control system 14 (FIG. 2) and is discussed below. The input into the path control system 12 of the follower vehicle control system 1 is the error calculated from the position ($x_p$, $y_p$) where the follower 4 should be (i.e., a selected traveled point 8) versus the actual position ($x_a$, $y_a$) of the follower 4. Specifically, the error is calculated from the value of the coordinates ($x_p$, $y_p$) that the follower 4 should reach, i.e., the coordinates of the selected traveled point 8, subtracted from the actual location ($x_a$, $y_a$) of the follower 4 (determined via dead-reckoning system 11). The error is passed into the path control system 12. In one embodiment, path control system 12 utilizes a control algorithm known as a "Pure Pursuit" algorithm developed by Carnegie Mellon University and described in "Implementation of the Pure Pursuit Path Tracking Algorithm," R. C. Coulter, Tech. rep., Carnegie Mellon University, 1992, which is incorporated herein by reference for all that it discloses. Alternatively, other types of control algorithms that are now known in the art or that may be developed in the future may be utilized by path control system 12.

The path control system 12 uses the Pure Pursuit algorithm to calculate a desired curvature $k_d$ that will drive the follower 4 to the correct location (traveled point 8). The curvature $k_d$ of the follower 4 is the inverse of the turn radius of the follower 4. The turn radius of the follower 4 refers to the radius of the control point of the follower 4. In this embodiment, the control point is the origin $O_b$ of the follower body frame ($O_b$ $X_b$ $Y_b$) in the middle of the two rear tires. The desired curvature $k_d$ is then passed to the steering control system 26, which controls the steering angle of the follower's wheels such that the desired curvature $k_d$ is achieved. Because of errors in measurements and other small errors the steering control system 26 does not output the precise desired curvature but outputs a slightly different curvature which is the actual curvature $k_a$. It is this actual curvature $k_a$ that causes the follower's 4 position coordinates to change. After the follower 4 has moved in response to the inputs of desired velocity $V_d$ and actual curvature $k_a$, the actual follower's position coordinates are estimated by the dead-reckoning system 11 and then used to calculate the new error e in the follower's position.

Figure 9:
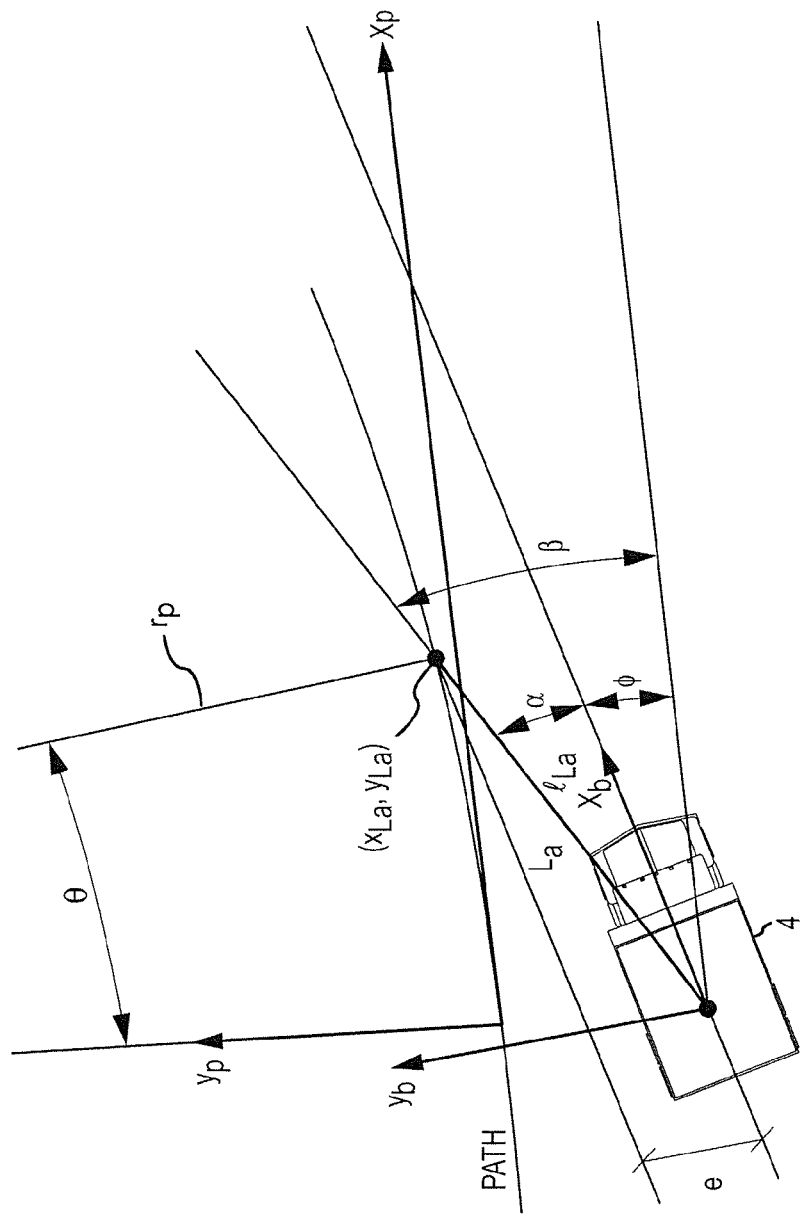
FIG. 9 is a schematic representation of the follower vehicle and look-ahead point in the follower vehicle coordinate system.
Figure 10:
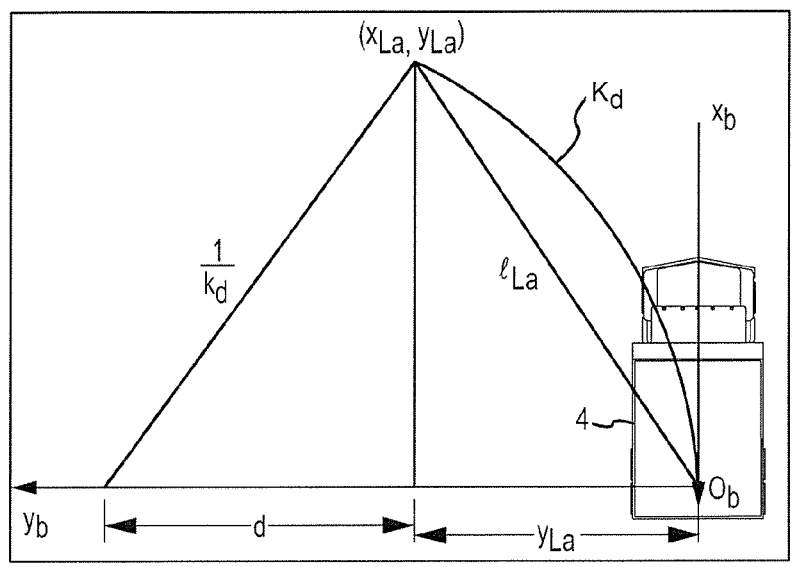
FIG. 10 is a geometric illustration of the look-ahead point's relation to curvature used to control the follower.

Referring to FIGS. 8-10, the details of how the follower 4 is controlled to correct the error discussed above i.e., maneuver to the path of the leader 2 with the selected traveled point 8 as the goal, will now be discussed. The Pure Pursuit algorithm utilized by the path control system 12 uses a look-ahead point ($x_{La}$, $y_{La}$) to calculate a curvature $k_d$, that will drive the follower 4 back onto the path taken by the leader 2 and thereby correct the error e. The error e will change due to inputs of curvature $k_d$. A look-ahead vector $L_a$ is used to designate the look-ahead point ($x_{La}$, $y_{La}$). The look-ahead vector $L_a$ extends from the control point $O_b$ toward the path traveled by the leader 2. The look-ahead point ($x_{La}$, $y_{La}$) is located at the intersection of the look-ahead vector $L_a$ and the path of the leader 2. A look-ahead distance $l_{La}$ is the distance from the look-ahead point ($x_{La}$, $y_{La}$) to the control point $O_b$ of the follower 4 along the look-ahead vector $L_a$.

Still referring to FIGS. 8-10, in determining the look-ahead point ($x_{La}$, $y_{La}$), a path coordinate frame ($O_p$ XP$Y_p$) is placed tangent to the path of the leader 2 and aligned with the follower 4 such that the x position of the control point $O_b$ in the path coordinate frame ($O_p$ XP$Y_p$) is zero. The $Y_p$-axis points toward the center of the leader's 2 traveled "circular" path. That is, the path traveled by the leader 2 is described in terms of a varying radius $r_p$, noting that as the path approaches a straight line, $r_p$ approaches infinity. The angle $\phi$ is the heading of the follower 4 as previously described. The angle $\alpha$ is the angle between the $X_b$-axis of the body frame and the look-ahead vector $L_a$. The angle $\beta$ is defined as the angle between the look-ahead point ($x_{La}$, $y_{La}$) and the $X_p$-axis of the path coordinate frame ($O_p$ $X_p$ $Y_p$). The error inputted into the path control system 12 can be $$e = l_{La} \sin(\alpha).$$

Furthermore, the y coordinate $y_{La}$ of the look-ahead point ($x_{La}$, $y_{La}$) and the y coordinate of the follower 4 in the path coordinate frame ($O_p$ $X_p$ $Y_p$) can be expressed as $$l_{La} \sin(\beta) = y_{La} - y.$$

In addition, $y_{La}$ can be expressed as $$y_{La} = r_p - r_p \cos(\theta)$$

where $\theta$ is the angle through which the look-ahead point ($x_{La}$, $y_{La}$) has gone around the path ahead of the vehicle.

As the look-ahead point ($x_{La}$, $y_{La}$) moves along the path, $y_{La}$ increases. This increase will cause a change in the error e. Accordingly, the desired error into the path control system 12 can be based on the current path of the leader 2 with the desired error approaching zero as the path of the leader 2 approaches a straight line. The desired error will increase as the radius of the turn decreases and as the velocity increases. In driving, typically as the turn radius decreases, the velocity must decrease in order to make the turn without sliding.

Referring primarily to FIGS. 9 and 10, the look-ahead point is illustrated in terms of the body frame ($O_b$ $X_b$ $Y_b$). The path control system 12 uses the look-ahead distance $l_{La}$ that is used as the radius of a circle that surrounds the follower, with the origin being at $O_b$. More specifically, the circle connects the look-ahead point ($x_{La}$, $y_{La}$) and the control point $O_b$, while being tangent to the $X_b$-axis;

$$\frac{1}{k_d}$$

is the radius of the circle. The desired curvature $k_d$ can be solved for using the Pythagorean theorem. The y coordinate value where the $$\frac{1}{k_d}$$

radius meets the $Y_b$-axis is $$\frac{1}{k_d} = y_{La} + d$$

Using the Pythagorean theorem with $$\frac{1}{k_d}$$

as the hypotenuse and solving for $k_d$ gives $$k_d = \frac{2 y_{La}}{l_{La}^2}.$$

Thus, the desired curvature $k_d$ commanded or outputted by the path control system 12 can be geometrically calculated such that if the follower 4 were to drive the desired curvature $k_d$ (adjusted in application to the actual curvature $k_a$) the follower 4 would arrive at the look-ahead point ($x_{La}$, $y_{La}$). The proportional gain is and the gain changes as the look-ahead distance changes. Thus, the error e comes from the look-ahead point $(x_{La}, y_{La})$ and not from the control point $O_b$ of the follower 4. The look-ahead point $(x_{La}, y_{La})$ acts as a predictor for the error of the follower 4 because the look-ahead point $(x_{La}, y_{La})$ is forward of the follower 4.

The steering control system 26 controls the follower 4 to a desired curvature $k_d$ by outputting an actual curvature $k_a$. The steering of the follower 4 is operated by the steering system 22. In one embodiment, the steering system includes a DC motor (not shown) connected to the steering shaft (not shown) of the follower vehicle 4. The DC motor rotates the steering shaft, which is coupled to a power steering gearbox (not shown) that assists in turning the wheels (adjusting the angle of the wheels). An encoder (not shown) mounted to the shaft of the motor measures the angular position of the shaft for feedback to the steering control system 26. The angular position of the motor shaft corresponds to the angle of the wheels of the follower 4. Thus, the angular position of the motor shaft is mapped into curvature $k_d$. That is, the steering control system 26 is fed a desired curvature $k_d$ and controls the DC motor to the desired curvature $k_d$ by adjusting the angular position of the motor shaft that produces the actual curvature $k_a$.

As the follower vehicle control system 1 and method 100 controls the follower 4 to stay on the same general path as the leader 2, the follower vehicle control system 1 and method 100 also controls the distance between the follower 4 and the leader 2. In order to ensure that the follower 4 and the leader are a safe distance apart at all times, the vehicle spacing control system 14 commands a velocity that produces the desired distance $d_d$ between the leader 2 and the follower 4. The length $d_d$ is a predetermined value that is proportional to the velocity of the leader 2 and/or follower 4. The vehicle spacing control system 14 commands the VCU 24 to adjust the propulsion system 18 and/or the braking system 20 of the follower 4 to maintain the predetermined, desired distance $d_d$.

Figure 11:
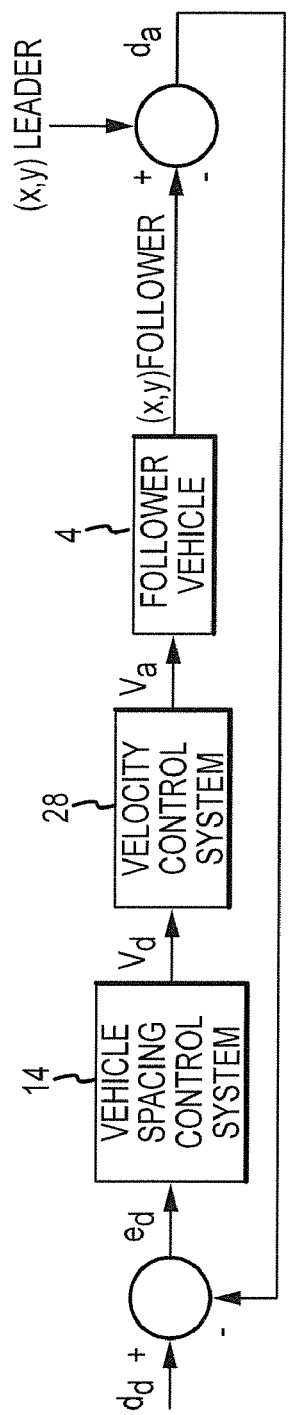
FIG. 11 is a schematic representation of a control loop involving the vehicle spacing control system.

FIG. 11 illustrates how the vehicle spacing control system 14 interacts with the follower 4. The input to the vehicle spacing control system 14 is the vehicle spacing distance error $e_d$. This error is $$e_d = d_d - d_a$$

where $d_d$ is the desired distance and $d_a$ is the actual distance of the path between the follower 4 and the leader 2. That is, the actual distance $d_a$ is the length between the leader 2 and the follower 4 along the path outlined by the traveled points 8. The vehicle spacing control system 14 communicates with the path tracking system 10 to obtain data for traveled points 8 and the location of the control point $O_b$. The actual distance $d_a$ is measured by summing the magnitude of each distance between the traveled points 8 for all of the acquired traveled points 8 not yet reached by the follower 4.

The follower vehicle control system 1 and method 100 of the present invention is advantageously set up to accommodate a leader 2 that is not a vehicle at all. FIG. 11 illustrates the arrangement where the position of the leader 2 is a disturbance in the control loop. The vehicle spacing control system 14 is designed to reject the disturbance input.

The distance between the leader 2 and follower 4 is controlled by the position of the follower 4 with respect to the leader 2. A velocity control system 28 of the VCU 24 that adjusts a throttle (not shown) in the propulsion system 18 and/or a brake actuator (not shown) in the braking system 20 controls the velocity.

Referring back now primarily to FIG. 3, the direction control system 16 of the follower vehicle control system 1 communicates with the tether unit 30 and the VCU 24 and commands the VCU 24 to shift into a desired gear. Thus, the general movement selection (e.g. Park, Reverse, Forward) of the follower 4 is not user-selected but rather, is determined by the follower vehicle control system 1 and method 100 of the present invention.

The direction control system 16 selects the direction of the follower based on the direction of rotation of the spool 34. Specifically, the direction control system 16 requests and receives information from the tether unit 30. As described above, the motor 32 and spool 34 are configured to maintain a predetermined amount of tension by either retracting the tether 6 when tension falls or paying-out the tether 6 when tension rises. The direction control system 16 can also receive information from the VCU 24 or sensors (not shown) to determine whether the follower 4 has ceased movement. The direction control system 16 is programmed to detect when the movement of the follower has ceased for more than a predetermined amount of time (e.g., 3 seconds). After the predetermined amount of time, the direction control system 16 monitors the direction of rotation of the spool 34. This monitoring of the spool 34 essentially detects the movement of the leader 2. That is, if the direction control system 16 detects rotation of the spool 34 such that the tether 6 is being payed-out, then the leader 2 is moving forward. If, on the other hand, the direction control system 16 detects rotation of the spool 34 such that the tether 6 is being reeled-in, then the leader 2 is moving in reverse. After the predetermined amount of time where movement has ceased, the direction control system 16 selects a gear according to the rotation of the spool 34. Thus, if the leader 2 reverses, the direction control system 16 senses the according rotation of the spool 34 and shifts the follower 4 into reverse. Likewise, if the direction control system 16 senses the rotation of the spool 34 identified with forward movement of the leader 2, the direction control system shifts the follower 4 into drive. The shift into drive or reverse is accomplished by a corresponding command from the direction control system 16 to the VCU 24, which then implements the commanded shifting.

Figure 12:
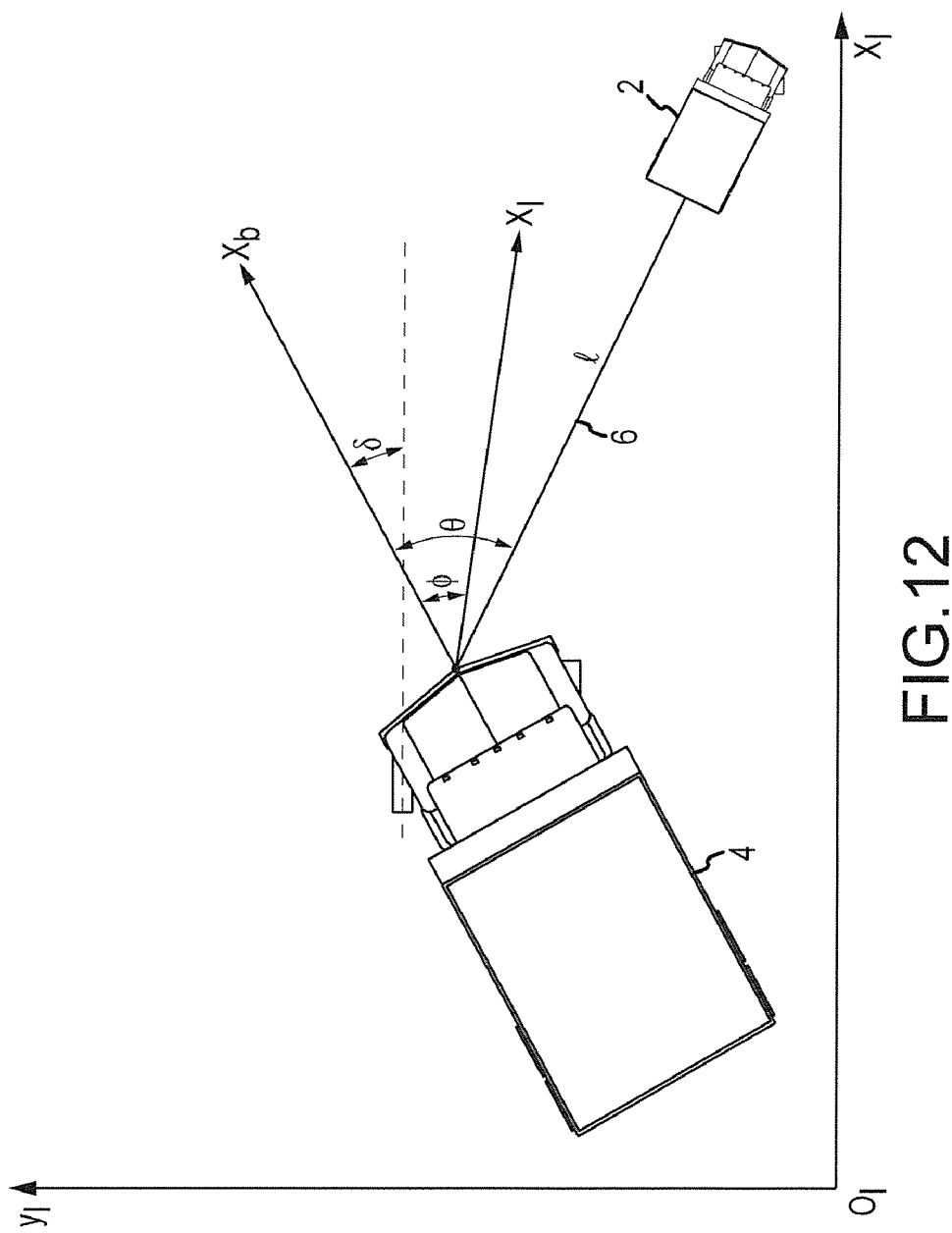
FIG. 12 is a pictorial representation, in the inertial coordinate system, of another embodiment for reverse movement of the leader and follower vehicle.

One of the advantages of the present invention is that in order to reverse the follower 4, a leader 2 need only stop for a predetermined amount of time and reverse itself to cause a decrease in tension in the tether 6. As the leader 2 reverses, the follower 4 also reverses. Referring to FIGS. 4 and 12, two modes for reverse movement are described herein. In the first mode for reverse movement, shown in FIG. 12, the path control system 12 commands the steering control system 60 of the VCU 24 to turn the turning wheels of the follower 4 at an angle δ, which is proportional to the measured angle θ. In the second embodiment, depicted in FIG. 4, the traveled points 8 that were previously reached by the follower 4 are once again set as goals for the follower 4 to reach (this time in reverse).

The first mode will now be described in more detail. FIG. 12 shows the same angles θ, φ, $X_b$-axis and $X_f$-axis as FIG. 1 and also illustrates angle δ measured from a center line of the tire to the $X_b$-axis. Just as the angle θ of the tether 6 from the follower 4 to the leader 2 is measured when moving forward, so too is the angle θ measured during reverse movement. In addition, the steering control system 60, which receives a command for the angle δ from the path control system 12, controls the steering system 30 of the follower 4 to produce $$\frac{2}{\ell_{La}^2}$$

the angle δ at the turning wheels. The angle δ is based on and determined from the angle θ of the tether 6. That is, the angle δ is proportional to the angle θ of the tether 6. With the self-retracting spool 34, there is enough tension in the tether 6 to measure the angle θ and thus, sufficient data to use for controlling the follower's wheels such that they turn at angle δ. In this way, the present invention causes the follower 4 to act like a trailer hitched to the leader 2. That is, the backwards movement of the follower 4 mimics a trailer attached to the leader 2.

In an alternative reverse or backing mode, a number of the traveled points 8 (e.g., corresponding to 100 meters) that the follower 4 has driven past are stored by the path tracking system 10 in memory 13. The path control system 12 uses these stored traveled points 8 during reverse movement to control the follower 4. Once the direction control system 16 commands a shift into reverse, the most recently attained traveled point 8 is sent from the path tracking system 10 to the path control system 12. As is done for forward movement, the path control system 12, as well as the vehicle spacing control system 14, make the necessary calculations and instruct the VCU 24 to control the propulsion system 18, braking system 20 and steering system 22 of the follower 4 to follow the previously traveled path outlined by the traveled points 8 in reverse—while maintaining the correct spacing between the follower 4 and the leader 2.

Figure 13:
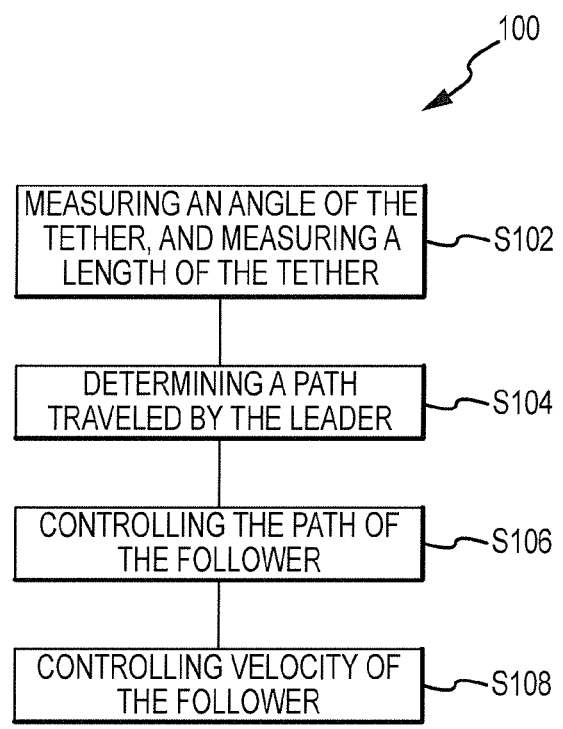
FIG. 13 is flow chart of a follower vehicle control method of the present invention.

The follower vehicle control method 100 of the present invention controls the follower 4 attached to the leader 2 by the tether 6. Referring to FIG. 13, the follower vehicle control method 100 includes measuring an angle θ between a heading of the follower 4 and the tether 6 and measuring a length l of the tether 6 between the follower 4 and the leader 2 (S102). A path of the leader 2 is tracked by determining a plurality of traveled points 8 in a path of the leader based on the angle θ and the length l (S104). The follower vehicle control method 100 further includes controlling the path of the follower 4 by driving the follower 4 to one or more of the traveled points 8 (S106). The velocity of the follower 4 is control system to maintain a predetermined spacing between the leader 2 and the follower 4 (S108).

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including", "having" and their derivatives. Any terms of degree such as "substantially", "about" and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. Any of the elements or units that perform data processing may be implemented in software, firmware or hardware, or any suitable combination thereof. It should be noted that while the present invention is shown and described herein as it could be used in conjunction with a configuration of various hardware and software, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A vehicle control system for causing a follower vehicle to follow a leader, comprising:
    a tether system mounted to the follower vehicle, said tether system comprising:
        a tether having an end adapted to be attached to the leader;
        a length sensor operatively associated with said tether, said length sensor sensing a length of said tether extending between the follower vehicle and the leader; and
        an angle sensor operatively associated with said tether, said angle sensor sensing an angle between said tether and the follower vehicle;
    a path tracking system operatively associated with said tether system, said path tracking system determining a path traveled by the leader;
    a path control system operatively associated with said path tracking system and the follower vehicle, said path control system causing the follower vehicle to follow the path traveled by the leader;
    a spacing control system operatively associated with said path tracking system and the follower vehicle, said spacing control system causing the follower vehicle to maintain a predetermined spacing between the follower vehicle and the leader; and
    a dead reckoning system operatively associated with the follower vehicle, said path tracking system, and said path control system, said dead reckoning system producing position and heading estimates of the follower vehicle.

2. The system of claim 1, wherein said dead reckoning system comprises an odometer and a steering angle sensor.

3. The system of claim 1, wherein said dead reckoning system comprises an odometer and a heading gyroscope.

4. A vehicle control system for causing a follower vehicle to follow a leader, comprising:
    a tether system mounted to the follower vehicle, said tether system comprising:
        a tether having an end adapted to be attached to the leader;

a length sensor operatively associated with said tether, said length sensor sensing a length of said tether extending between the follower vehicle and the leader; and an angle sensor operatively associated with said tether, said angle sensor sensing an angle between said tether and the follower vehicle;

a path tracking system operatively associated with said tether system, said path tracking system determining a path traveled by the leader;

a path control system operatively associated with said path tracking system and the follower vehicle, said path control system causing the follower vehicle to follow the path traveled by the leader;

a spacing control system operatively associated with said path tracking system and the follower vehicle, said spacing control system causing the follower vehicle to maintain a predetermined spacing between the follower vehicle and the leader; and a direction control system operatively associated with the follower vehicle and said tether system, said direction control system selecting between a forward travel direction and a reverse travel direction for the follower vehicle based on a change in length of said tether.

5. A vehicle control system for causing a follower vehicle to follow a leader, comprising:

a tether system mounted to the follower vehicle, said tether system comprising:

a tether having an end adapted to be attached to the leader;

a length sensor operatively associated with said tether, said length sensor sensing a length of said tether extending between the follower vehicle and the leader; and an angle sensor operatively associated with said tether, said angle sensor sensing an angle between said tether and the follower vehicle, a path tracking system operatively associated with said tether system, said path tracking system determining a path traveled by the leader;

a path control system operatively associated with said path tracking system and the follower vehicle, said path control system causing the follower vehicle to follow the path traveled by the leader;

a spacing control system operatively associated with said path tracking system and the follower vehicle, said spacing control system causing the follower vehicle to maintain a predetermined spacing between the follower vehicle and the leader; and a damper operatively associated with said angle sensor.

6. A vehicle control system for causing a follower vehicle to follow a leader, comprising:

a tether mounted to the follower vehicle, said tether having an end adapted to be attached to the leader;

length sensing means operatively associated with said tether for sensing a length of said tether extending between the follower vehicle and the leader;

angle sensing means operatively associated with said tether for sensing an angle between said tether and the follower vehicle;

a path tracking system operatively associated with said length sensing means and said angle sensing means, said path tracking system determining a path traveled by the leader;

a path control system operatively associated with said path tracking system and the follower vehicle, said path control system causing the follower vehicle to follow the path traveled by the leader;

a spacing control system operatively associated with said path tracking system and the follower vehicle, said spacing control system causing the follower vehicle to maintain a predetermined spacing between the follower vehicle and the leader; and a dead reckoning system operatively associated with the follower vehicle, said path tracking system, and said path control system, said dead reckoning system producing position and heading estimates of the follower vehicle.

7. A method for causing a follower vehicle to follow a leader, comprising:

connecting the follower vehicle to the leader with a tether;

measuring a length of the tether connecting the follower vehicle to the leader;

measuring an angle between the tether and the follower vehicle;

determining a position of the leader based on the measured length and the measured angle;

determining a path traveled by the leader based on a plurality of determined leader positions;

steering the follower vehicle so that the follower vehicle substantially follows the path traveled by the leader, wherein steering the follower vehicle comprises:

determining an actual position of the follower vehicle;

comparing the actual position of the follower vehicle with a desired position of the follower vehicle to determine an off-path error;

using the off-path error to calculate a desired curvature; and using the desired curvature to produce a steering command for the follower vehicle; and controlling a velocity of the follower vehicle so that the follower vehicle maintains a predetermined distance from the leader.

8. The method of claim 7, wherein using the off-path error to calculate a desired curvature comprises:

establishing a look-ahead length;

using the look-ahead length to identify a look-ahead point on the path traveled by the leader; and using the look-ahead point to determine the off-path error.

9. The method of claim 8, wherein the look-ahead length is a function of the velocity of the follower vehicle.

10. A method for causing a follower vehicle to follow a leader, comprising:

connecting the follower vehicle to the leader with a tether measuring a length of the tether connecting the follower vehicle to the leader;

measuring an angle between the tether and the follower vehicle;

determining a position of the leader based on the measured length and the measured angle;

determining a path traveled by the leader based on a plurality of determined leader positions;

steering the follower vehicle so that the follower vehicle substantially follows the path traveled by the leader; and controlling a velocity of the follower vehicle so that the follower vehicle maintains a predetermined distance from the leader, wherein controlling the velocity of the follower vehicle comprises:

determining an actual length between the leader and the follower vehicle, the actual length being measured along the path traveled by the leader;

determining a desired length between the leader and the follower vehicle, the desired length being measured along the path traveled by the leader;

comparing the actual length and the desired length to determine a vehicle spacing error; and using the vehicle spacing error to control the velocity of the follower vehicle.

11. A method for causing a follower vehicle to follow a leader, comprising:

connecting the follower vehicle to the leader with a tether;

measuring a length of the tether connecting the follower vehicle to the leader;

measuring an angle between the tether and the follower vehicle;

determining a position of the leader based on the measured length and the measured angle;

determining a path traveled by the leader based on a plurality of determined leader positions;

steering the follower vehicle so that the follower vehicle substantially follows the path traveled by the leader;

controlling a velocity of the follower vehicle so that the follower vehicle maintains a predetermined distance from the leader;

operating the follower vehicle in a reverse travel direction; and steering the follower vehicle in the reverse travel direction to follow in reverse at least a portion of the path traveled by the leader.

12. A method for causing a follower vehicle to follow a leader, comprising:

connecting the follower vehicle to the leader with a tether;

measuring a length of the tether connecting the follower vehicle to the leader;

measuring an angle between the tether and the follower vehicle;

determining a position of the leader based on the measured length and the measured angle;

determining a path traveled by the leader based on a plurality of determined leader positions;

steering the follower vehicle so that the follower vehicle substantially follows the path traveled by the leader;

controlling a velocity of the follower vehicle so that the follower vehicle maintains a predetermined distance from the leader;

operating the follower vehicle in a reverse travel direction; and steering the follower vehicle in the reverse travel direction based on the measured angle between the tether and the follower vehicle.

13. A method for causing a follower vehicle to follow a leader, comprising:

connecting the follower vehicle to the leader with a tether;

measuring a length of the tether connecting the follower vehicle to the leader;

measuring an angle between the tether and the follower vehicle;

determining a position of the leader based on the measured length and the measured angle;

determining a path traveled by the leader based on a plurality of determined leader positions;

steering the follower vehicle so that the follower vehicle substantially follows the path traveled by the leader;

controlling a velocity of the follower vehicle so that the follower vehicle maintains a predetermined distance from the leader; and selecting to operate the follower vehicle in either a forward travel direction or a reverse travel direction for the follower vehicle based on a change in length of said tether.

* * * * *